United States Patent
Kim et al.

(10) Patent No.: US 11,657,800 B2
(45) Date of Patent: May 23, 2023

(54) ELECTRONIC DEVICE WITH WAKEUP WORD DETERMINED MULTI-MODE OPERATION

(71) Applicant: LG ELECTRONICS INC., Seoul (KR)

(72) Inventors: Jaehong Kim, Seoul (KR); Hyoeun Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 357 days.

(21) Appl. No.: 16/500,084

(22) PCT Filed: Apr. 26, 2019

(86) PCT No.: PCT/KR2019/005060
§ 371 (c)(1),
(2) Date: Oct. 1, 2019

(87) PCT Pub. No.: WO2020/218650
PCT Pub. Date: Oct. 29, 2020

(65) Prior Publication Data
US 2021/0383794 A1     Dec. 9, 2021

(51) Int. Cl.
*G10L 15/08* (2006.01)
*G10L 25/27* (2013.01)

(52) U.S. Cl.
CPC .............. *G10L 15/08* (2013.01); *G10L 25/27* (2013.01); *G10L 2015/088* (2013.01)

(58) Field of Classification Search
CPC .... G10L 15/08; G10L 25/27; G10L 2015/088
See application file for complete search history.

(56) References Cited

U.S. PATENT DOCUMENTS

| | | | |
|---|---|---|---|
| 9,875,081 B2 | 1/2018 | Meyers et al. | |
| 10,540,960 B1* | 1/2020 | Jones | G06N 20/00 |
| 10,777,189 B1* | 9/2020 | Fu | G10L 15/22 |
| 10,847,149 B1* | 11/2020 | Mok | G10L 15/22 |

(Continued)

FOREIGN PATENT DOCUMENTS

| | | |
|---|---|---|
| KR | 100354365 | 9/2002 |
| KR | 1020040045120 | 6/2004 |

(Continued)

OTHER PUBLICATIONS

PCT International Application No. PCT/KR2019/005060, Written Opinion of the International Searching Authority dated Jan. 23, 2020, 8 pages.

(Continued)

*Primary Examiner* — Michelle M Koeth
(74) *Attorney, Agent, or Firm* — Lee, Hong, Degerman, Kang & Waimey PC

(57) ABSTRACT

An artificial intelligence device is provided. The artificial intelligence device according to an embodiment of the present disclosure includes: an input unit configured to receive a speech input; and a processor configured to operate in an interaction mode if a second wakeup word for setting an operation mode is recognized after a first wakeup word for calling the artificial intelligence device is recognized, and process one or more commands received after the second wakeup word according to the operation mode indicated by the second wakeup word.

11 Claims, 10 Drawing Sheets

(56) References Cited

U.S. PATENT DOCUMENTS

| | | | |
|---|---|---|---|
| 10,957,329 B1 * | 3/2021 | Liu | G06F 3/017 |
| 11,037,562 B2 * | 6/2021 | Shah | G06F 3/167 |
| 2003/0202776 A1 | 10/2003 | Kendall et al. | |
| 2004/0021899 A1 | 2/2004 | Jost et al. | |
| 2013/0041670 A1 | 2/2013 | Morgan et al. | |
| 2015/0348554 A1 * | 12/2015 | Orr | G06F 3/167 |
| | | | 704/275 |
| 2017/0243328 A1 | 8/2017 | Lee et al. | |
| 2018/0108343 A1 * | 4/2018 | Stevans | G10L 13/00 |
| 2019/0057684 A1 | 2/2019 | Roh et al. | |
| 2019/0073998 A1 * | 3/2019 | Leblang | G10L 15/30 |
| 2020/0312318 A1 * | 10/2020 | Olson | G06F 3/167 |

FOREIGN PATENT DOCUMENTS

| | | |
|---|---|---|
| KR | 1020040106376 | 12/2004 |
| KR | 100520019 | 10/2005 |
| KR | 1020160044979 | 4/2016 |
| KR | 1020170090162 | 8/2017 |
| KR | 101841248 | 3/2018 |
| KR | 1020180127102 | 11/2018 |
| KR | 1020190019401 | 2/2019 |
| KR | 1020190026521 | 3/2019 |
| WO | 2018114359 | 6/2018 |

OTHER PUBLICATIONS

PCT International Application No. PCT/KR2019/007145, Written Opinion of the International Searching Authority dated Apr. 23, 2020, 8 pages.

\* cited by examiner

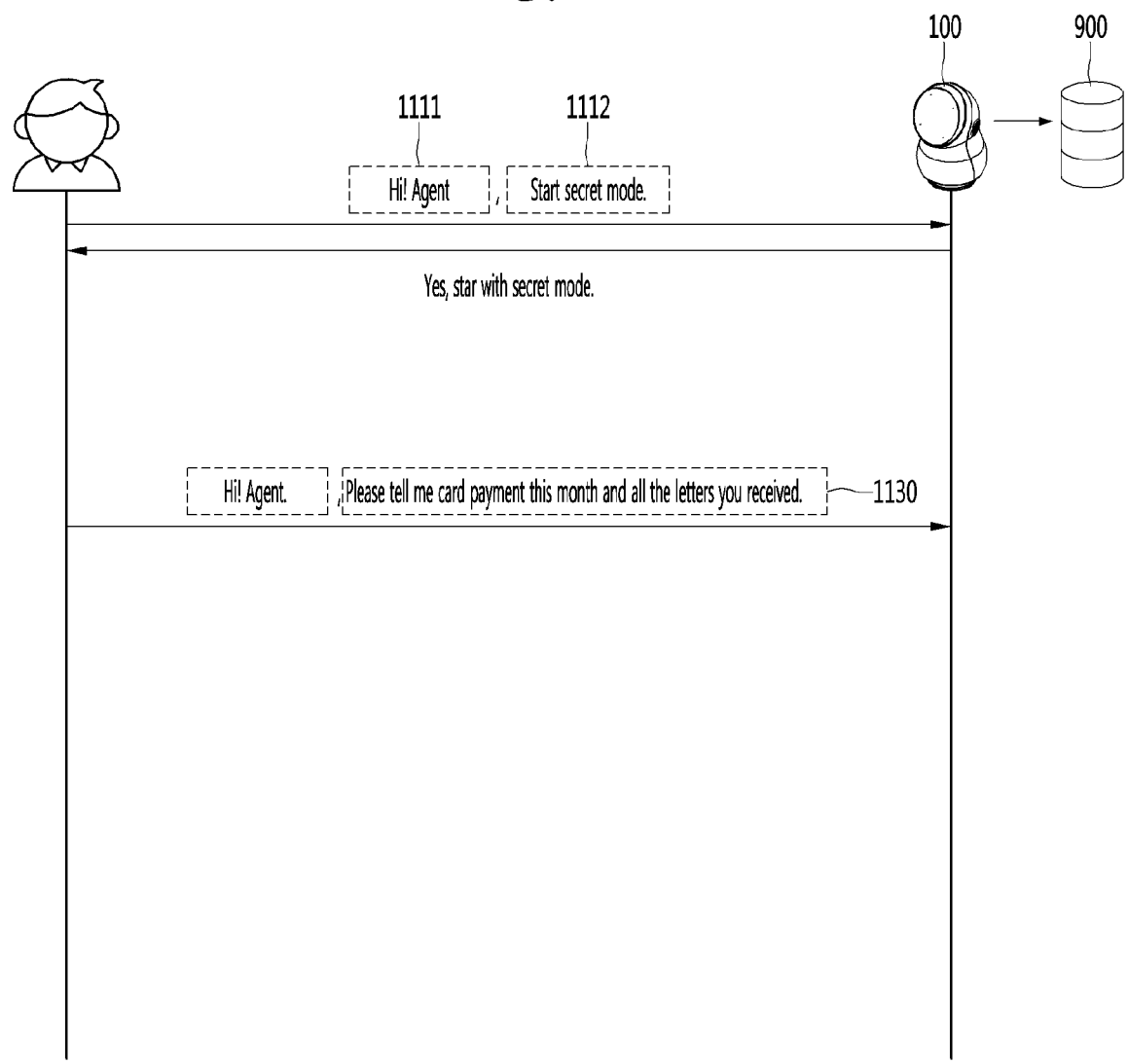

ELECTRONIC DEVICE WITH WAKEUP WORD DETERMINED MULTI-MODE OPERATION

CROSS-REFERENCE TO RELATED APPLICATIONS

This application is the National Stage filing under 35 U.S.C. 371 of International Application No. PCT/KR2019/005060, filed on Apr. 26, 2019, the contents of which are hereby incorporated by reference herein in its entirety.

TECHNICAL FIELD

The present disclosure relates to an electronic device capable of operating in various modes according to whether a second wakeup word is recognized after a first wakeup word for calling the electronic device is recognized, and a type of the second wakeup word.

BACKGROUND ART

Artificial intelligence (AI) is one field of computer engineering and information technology for studying a method of enabling a computer to perform thinking, learning, and self-development that can be performed by human intelligence and may denote that a computer imitates an intelligent action of a human.

Moreover, artificial intelligence is directly or indirectly associated with the other field of computer engineering without being individually provided. Particularly, at present, in various fields of information technology, an attempt to introduce artificial intelligence components and use the artificial intelligence components in solving a problem of a corresponding field is being actively done.

The competition for speech recognition technology, which has been started from smart phones, is expected to ignite in the house in line with the proliferation of the Internet of Things (IoT).

In particular, it is noteworthy that the device is an artificial intelligence (AI) device that can command and communicate via speech.

A speech recognition service utilizes a huge database to select an optimal answer to a user's question.

A speech search function also converts input speech data into a text in a cloud server, analyzes the text, and transmits a real-time search result to the device.

The cloud server has computing capability capable of storing numerous words and processing the words in real time by dividing the words into speech data by gender, age, and intonation.

As more speech data accumulates, speech recognition will be accurate to the level equivalent to the human (human parity).

Meanwhile, in the related art, a user utters a wakeup word, calls a speech agent, and then utters a command (request, question, etc.) following the wakeup word. In this case, the speech agent recognizes the command by enabling the command recognition function after recognizing the wakeup word, and disables the command recognition function after processing the command.

In other words, the user is provided with a speech recognition service by uttering a wakeup word, a one-time request or question, re-uttering a wakeup word, and repeating a one-time request or question that is independent of a previous request or question.

The reason for disabling the command recognition function after processing the command is to prevent the misrecognition due to other speech (speech for everyday conversation other than speech for command input, television sound, etc.).

However, if speech recognition is performed in a uniform manner, there is a problem that the speech recognition agent cannot provide a speech recognition service in the form of interacting with a user.

DISCLOSURE OF THE INVENTION

Technical Problem

The present disclosure has been made in an effort to solve the above problems, and is directed to provide an electronic device capable of operating in various modes according to whether a second wakeup word is recognized after a first wakeup word is recognized and a type of the second wakeup word.

Technical Solution

According to one embodiment of the present disclosure, an artificial intelligence device includes: an input unit configured to receive a speech input; and a processor configured to operate in an interaction mode if a second wakeup word for setting an operation mode is recognized after a first wakeup word for calling the artificial intelligence device is recognized, and process one or more commands received after the second wakeup word according to the operation mode indicated by the second wakeup word.

BRIEF DESCRIPTION OF THE DRAWINGS

FIG. 11 is a diagram for describing a secret mode according to an embodiment of the present disclosure.

BEST MODE

Figure 1:
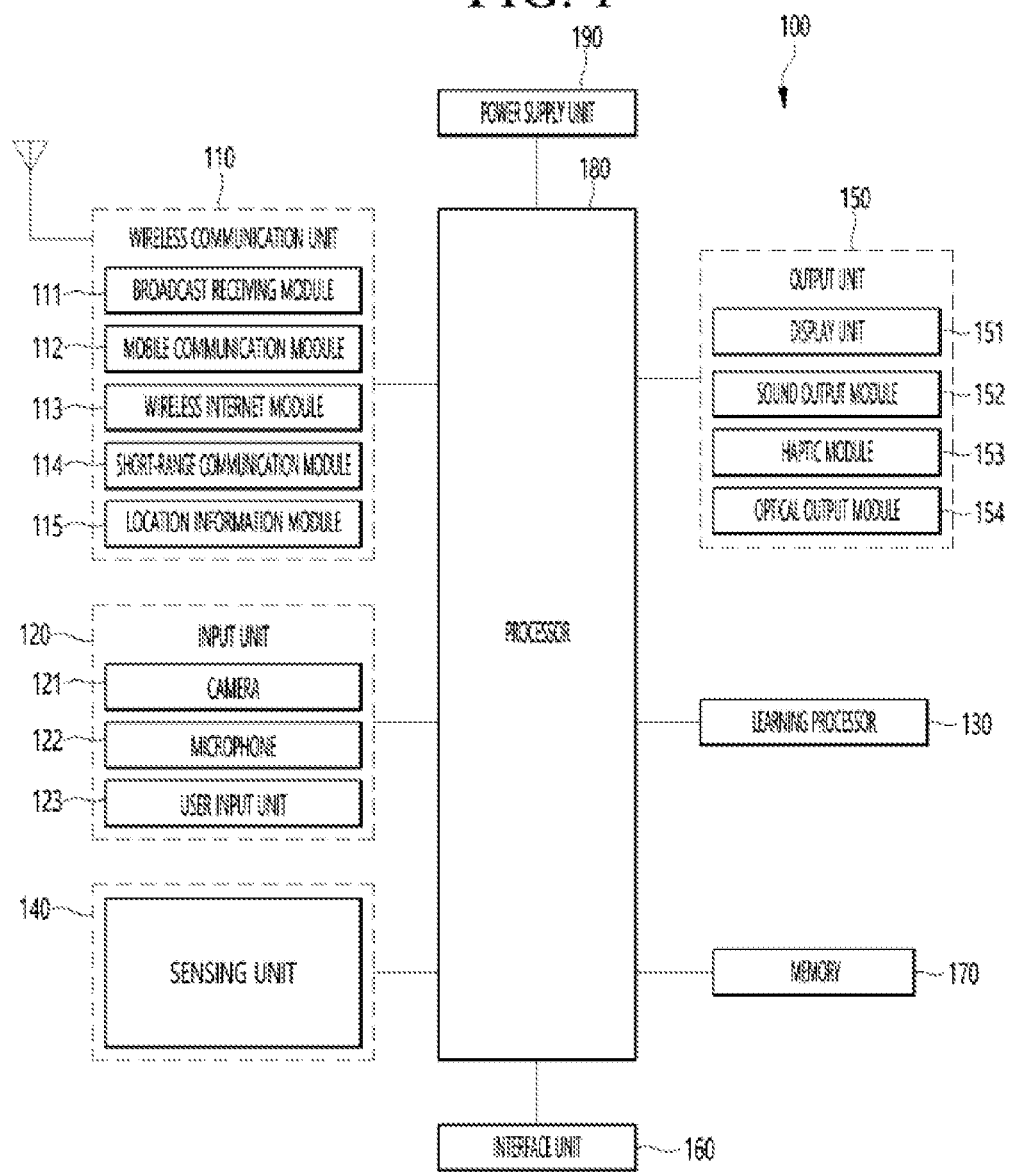
FIG. 1 is a block diagram for describing an AI device according to the present disclosure.

Hereinafter, embodiments of the present disclosure are described in more detail with reference to accompanying drawings and regardless of the drawings symbols, same or similar components are assigned with the same reference numerals and thus overlapping descriptions for those are omitted. The suffixes "module" and "unit" for components used in the description below are assigned or mixed in consideration of easiness in writing the specification and do not have distinctive meanings or roles by themselves. In the following description, detailed descriptions of well-known functions or constructions will be omitted since they would obscure the disclosure in unnecessary detail. Additionally, the accompanying drawings are used to help easily understanding embodiments disclosed herein but the technical idea of the present disclosure is not limited thereto. It should be understood that all of variations, equivalents or substitutes contained in the concept and technical scope of the present disclosure are also included.

It will be understood that the terms "first" and "second" are used herein to describe various components but these components should not be limited by these terms. These terms are used only to distinguish one component from other components.

In this disclosure below, when one part (or element, device, etc.) is referred to as being 'connected' to another part (or element, device, etc.), it should be understood that the former can be 'directly connected' to the latter, or 'electrically connected' to the latter via an intervening part (or element, device, etc.). It will be further understood that when one component is referred to as being 'directly connected' or 'directly linked' to another component, it means that no intervening component is present.

The AI device described herein may include a mobile phone, a smart phone, a laptop computer, a digital broadcasting terminal, a personal digital assistant (PDA), a portable multimedia player (PMP), a navigation, a slate PC, a tablet PC, an ultrabook, a wearable device (for example, a smartwatch, a smart glass, or a head mounted display (HMD)), and the like.

However, the AI device 100 according to the embodiment described herein may be applied to a stationary AI device such as a smart TV, a desktop computer, a digital signage, or the like.

In addition, the AI device 100 according to the embodiment of the present disclosure may be applied to a stationary or movable robot.

In addition, the AI device 100 according to the embodiment of the present disclosure may perform a function of a speech agent. The speech agent may be a program that recognizes a speech of a user and outputs a response suitable for the recognized speech of the user as a speech.

The AI device 100 may include a wireless communication unit 110, an input unit 120, a learning processor 130, a sensing unit 140, an output unit 150, an interface unit 160, a memory 170, a processor 180, and a power supply unit 190.

The wireless communication unit 110 may include at least one of a broadcast receiving module 111, a mobile communication module 112, a wireless Internet module 113, a short-range communication module 114, or a location information module 115.

The broadcast receiving module 111 of the wireless communication unit 110 may receive a broadcast signal and/or broadcast related information from an external broadcast management server through a broadcast channel.

The mobile communication module 112 may transmit/receive a wireless signal to/from at least one of a base station, an external AI device, or a server on a mobile communication network established according to the technical standards or communication methods for mobile communication (for example, Global System for Mobile communication (GSM), Code Division Multi Access (CDMA), Code Division Multi Access 2000 (CDMA2000), Enhanced Voice-Data Optimized or Enhanced Voice-Data Only (EV-DO), Wideband CDMA (WCDMA), High Speed Downlink Packet Access (HSDPA), High Speed Uplink Packet Access (HSUPA), Long Term Evolution (LTE), and Long Term Evolution-Advanced (LTE-A)).

The wireless Internet module 113 refers to a module for wireless Internet access and may be built in or external to the AI device 100. The wireless Internet module 113 may be configured to transmit/receive a wireless signal in a communication network according to wireless internet technologies.

The wireless internet technology may include Wireless LAN (WLAN), Wireless-Fidelity (Wi-Fi), Wi-Fi Direct, Digital Living Network Alliance (DLNA), Wireless Broadband (WiBro), World Interoperability for Microwave Access (WiMAX), High Speed Downlink Packet Access (HSDPA), High Speed Uplink Packet Access (HSUPA), Long Term Evolution (LTE), and Long Term Evolution-Advanced (LTE-A) and the wireless internet module 113 transmits/receives data according at least one wireless internet technology including internet technology not listed above.

The short-range communication module 114 may support short-range communication by using at least one of Bluetooth™, Radio Frequency Identification (RFID), Infrared Data Association (IrDA), Ultra Wideband (UWB), ZigBee, Near Field Communication (NFC), Wireless-Fidelity (Wi-Fi), Wi-Fi Direct, or Wireless Universal Serial Bus (USB) technologies.

The location information module 115 is a module for obtaining the location (or the current location) of a AI device and its representative examples include a global positioning system (GPS) module or a Wi-Fi module. For example, the AI device may obtain its position by using a signal transmitted from a GPS satellite through the GPS module.

The input unit 120 may include a camera 121 for image signal input, a microphone 122 for receiving audio signal input, and a user input unit 123 for receiving information from a user.

Voice data or image data collected by the input unit 120 are analyzed and processed as a user's control command.

Then, the input unit 120 is used for inputting image information (or signal), audio information (or signal), data, or information inputted from a user and the AI device 100 may include at least one camera 121 in order for inputting image information.

The camera 121 processes image frames such as a still image or a video obtained by an image sensor in a video call mode or a capturing mode. The processed image frame may be displayed on the display unit 151 or stored in the memory 170.

The microphone 122 processes external sound signals as electrical voice data. The processed voice data may be utilized variously according to a function (or an application program being executed) being performed in the AI device 100. Moreover, various noise canceling algorithms for removing noise occurring during the reception of external sound signals may be implemented in the microphone 122.

The user input unit 123 is to receive information from a user and when information is inputted through the user input unit 123, the processor 180 may control an operation of the AI device 100 to correspond to the inputted information.

The user input unit 123 may include a mechanical input means (or a mechanical key, for example, a button, a dome switch, a jog wheel, and a jog switch at the front, back or side of the AI device 100) and a touch type input means. As one example, a touch type input means may include a virtual key, a soft key, or a visual key, which is displayed on a touch screen through software processing or may include a touch key disposed at a portion other than the touch screen.

The learning processor 130 may be configured to receive, classify, store, and output information which is to be used for data mining, data analysis, intelligent decision, and machine learning algorithms.

The learning processor 130 may include one or more memory units which are configured to store data received, detected, sensed, generated, pre-defined, or outputted by another component, another device, another AI device, or an apparatus communicating with the AI device.

The learning processor 130 may include a memory which is integrated into or implemented in a AI device. In some embodiments, the learning processor 130 may be implemented with the memory 170.

Optionally or additionally, the learning processor 130 may be implemented with a memory associated with a AI device like an external memory directly coupled to the AI device or a memory which is maintained in a server communicating with the AI device.

In another embodiment, the learning processor 130 may be implemented with a memory maintained in a cloud computing environment or another remote memory position accessible by a AI device through a communication manner such as a network.

Information stored in the learning processor 130 may be used by the processor 180 or one or more other controllers of a AI device by using at least one of various different types of data analysis algorithm or machine learning algorithm.

Examples of such algorithms may include a k-nearest neighbor system, a purge logic (for example, possibility theory), a neural network, Boltzmann machine, vector quantization, a pulse neural network, a support vector machine, a maximum margin classifier, hill climbing, an induction logic system Bayesian network, perrytnet (for example, a finite state machine, a milli machine, and a moor finite state machine), a classifier tree (for example, a perceptron tree, a support vector tree, a Markov tree, a decision tree forest, and an arbitrary forest), a reading model and system, artificial mergence, sensor mergence, image mergence, reinforcement mergence, augment reality, pattern recognition, and automated plan.

The processor 180 may determine or predict at least one executable operation of a AI device, based on information determined or generated by using a data analysis algorithm and a machine learning algorithm. To this end, the processor 180 may request, search for, receive, or use data of the learning processor 130 and may control the AI device to execute a predicted operation or a preferably determined operation of the at least one executable operation.

The processor 180 may perform various functions of implementing an intelligent emulation (i.e., a knowledge-based system, an inference system, and a knowledge acquisition system). The processor 180 may be applied to various types of systems (for example, a purge logic system) including an adaptive system, a machine learning system, and an ANN.

The processor 180 may include a sub-module enabling an arithmetic operation of processing a voice and a natural language voice, like an input/output (I/O) processing module, an environment condition processing module, a speech-to-text (STT) processing module, a natural language processing module, a work flow processing module, and a service processing module.

Each of such sub-modules may access one or more systems or data and models or a subset or superset thereof in a AI device. Also, each of the sub-modules may provide various functions in addition to vocabulary index, user data, a work flow model, a service model, and an automatic speech recognition (ASR) system.

In another embodiment, another aspect of the processor 180 or a AI device may be implemented with the sub-module, system, or data and model.

In some embodiments, based on data of the learning processor 130, the processor 180 may be configured to detect and sense a requirement on the basis of an intention of a user or a context condition expressed as a user input or a natural language input.

The processor 180 may actively derive and obtain information which is needed in completely determining the requirement on the basis of the intention of the user or the context condition. For example, the processor 180 may analyze past data including an input log, an output log, pattern matching, unambiguous words, and an input intention, thereby actively deriving needed for determining the requirement.

The processor 180 may determine task flow for executing a function of responding to the requirement, based on the intention of the user or the context condition.

The processor 180 may be configured to collect, sense, extract, detect, and/or receive a signal or data used for data analysis and a machine learning operation through one or more sensing components in a AI device, for collecting information which is to be processed and stored in the learning processor 130.

Collecting of information may include an operation of sensing information through a sensor, an operation of extracting information stored in the memory 170, or an operation of receiving information through a communication means from another AI device, an entity, or an external storage device.

The processor 180 may collect usage history information from the AI device and may store the collected usage history information in the memory 170.

The processor 180 may determine an optimal match for executing a specific function by using the stored usage history information and prediction modeling.

The processor 180 may receive or sense ambient environmental information or other information through the sensing unit 140.

The processor 180 may receive a broadcast signal and/or broadcast-related information, a wireless signal, and wireless data through the wireless communication unit 110.

The processor 180 may receive image information (or a corresponding signal), audio information (or a corresponding signal), data, or user input information through the input unit 120.

The processor 180 may collect information in real time and may process or classify the collected information (for example, a knowledge graph, an instruction policy, an individualization database, a dialogue engine, etc.) and may store the processed information in the memory 170 or the learning processor 130.

When an operation of the AI device is determined based on the data analysis algorithm, the machine learning algorithm, and technique, the processor 180 may control elements of the AI device for executing the determined operation. Also, the processor 180 may control the AI device according to a control instruction to perform the determined operation.

When a specific operation is performed, the processor 180 may analyze history information representing execution of the specific operation through the data analysis algorithm, the machine learning algorithm, and technique and may update previously learned information, based on the analyzed information.

Therefore, the processor 180 may enhance an accuracy of a future performance of each of the data analysis algorithm, the machine learning algorithm, and the technique along with the learning processor 130, based on the updated information.

The sensing unit 140 may include at least one sensor for sensing at least one of information in a AI device, environmental information around a AI device, or user information.

For example, the sensing unit 140 may include at least one of a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, an ultrasonic sensor, an optical sensor (for example, the camera 121), a microphone (for example, the microphone 122), a battery gauge, an environmental sensor (for example, a barometer, a hygrometer, a thermometer, a radiation sensor, a thermal sensor, and a gas sensor), or a chemical sensor (for example, an electronic nose, a healthcare sensor, and a biometric sensor). Moreover, an AI device disclosed in this specification may combines information sensed by at least two or more sensors among such sensors and may then utilize it.

The output unit 150 is used to generate a visual, auditory, or haptic output and may include at least one of a display unit 151, a sound output module 152, a haptic module 153, or an optical output module 154.

The display unit 151 may display (output) information processed in the AI device 100. For example, the display unit 151 may display execution screen information of an application program running on the AI device 100 or user interface (UI) and graphic user interface (GUI) information according to such execution screen information.

The display unit 151 may be formed with a mutual layer structure with a touch sensor or formed integrally, so that a touch screen may be implemented. Such a touch screen may serve as the user input unit 123 providing an input interface between the AI device 100 and a user, and an output interface between the AI device 100 and a user at the same time.

The sound output module 152 may output audio data received from the wireless communication unit 110 or stored in the memory 170 in a call signal reception or call mode, a recording mode, a voice recognition mode, or a broadcast reception mode.

The sound output module 152 may include a receiver, a speaker, and a buzzer.

The haptic module 153 generates various haptic effects that a user can feel. A representative example of a haptic effect that the haptic module 153 generates is vibration.

The optical output module 154 outputs a signal for notifying event occurrence by using light of a light source of the AI device 100. An example of an event occurring in the AI device 100 includes message reception, call signal reception, missed calls, alarm, schedule notification, e-mail reception, and information reception through an application.

The interface unit 160 may serve as a path to various kinds of external devices connected to the AI device 100. The interface unit 160 may include at least one of a wired/wireless headset port, an external charger port, a wired/wireless data port, a memory card port, a port connecting a device equipped with an identification module, an audio Input/Output (I/O) port, an image I/O port, and or an earphone port. In correspondence to that an external device is connected to the interface unit 160, the AI device 100 may perform an appropriate control relating to the connected external device.

Moreover, the identification module, as a chip storing various information for authenticating usage authority of the AI device 100, may include a user identity module (UIM), a subscriber identity module (SIM), and a universal subscriber identity module (USIM). A device equipped with an identification module (hereinafter referred to as an identification device) may be manufactured in a smart card form. Accordingly, the identification device may be connected to the AI device 100 through the interface unit 160.

The memory 170 may store data for supporting various functions of the AI device 100.

The memory 170 may store a plurality of application programs or applications executed in the AI device 100, pieces of data and instructions for an operation of the AI device 100, and pieces of data (for example, at least one piece of algorithm information for machine learning) for an operation of the learning processor 130.

The processor 180 may control overall operations of the AI device 100 generally besides an operation relating to the application program. The processor 180 may provide appropriate information or functions to a user or process them by processing signals, data, and information inputted/outputted through the above components or executing application programs stored in the memory 170.

Additionally, in order to execute an application program stored in the memory 170, the processor 180 may control at least part of the components shown in FIG. 1. Furthermore, in order to execute the application program, the processor 180 may combine at least two of the components in the AI device 100 and may then operate it.

As described above, the processor 180 may control an operation associated with an application program and an overall operation of the AI device 100. For example, when a state of the AI device 100 satisfies a predetermined condition, the processor 180 may execute or release a lock state which limits an input of a control command of a user for applications.

The power supply unit 190 may receive external power or internal power under a control of the processor 180 and may then supply power to each component in the AI device 100. The power supply unit 190 includes a battery and the battery may be a built-in battery or a replaceable battery.

Meanwhile, as described above, the processor 180 controls the operation associated with the application program and the overall operation of the AI device 100. For example, if the state of the mobile AI device satisfies a set condition, the processor 180 may execute or release a lock state which limits an input of a control command of a user for applications.

Figure 2:
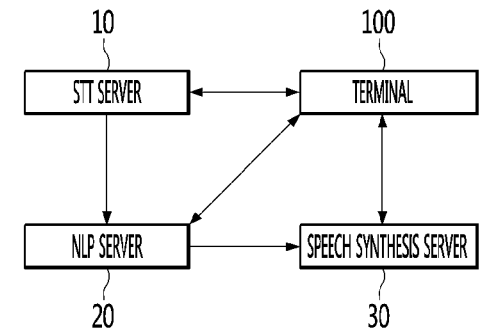
FIG. 2 is a diagram for describing a speech system according to an embodiment of the present disclosure.

FIG. 2 is a diagram for describing a speech system according to an embodiment of the present disclosure.

Referring to FIG. 2, the speech system 1 may include an AI device 100, a speech to text (STT) server 10, a natural language processing (NLP) server 20, and a speech synthesis server 30.

The AI device 100 may transmit speech data to the STT server 10.

The STT server 10 may convert speech data received from the AI device 100 into text data.

The STT server 10 may increase the accuracy of speech-to-text conversion by using a language model.

The language model may refer to a model that can calculate a probability of a sentence or calculate a probability that a next word will appear when previous words are given.

For example, the language model may include probabilistic language models such as a unigram model, a bigram model, or an N-gram model.

The unigram model is a model that assumes that the utilization of all words is completely independent. The unigram model is a model that calculates the probability of a word sequence as the product of the probabilities of the respective words.

The bigram model is a model that assumes that the utilization of a word depends only on the previous one word.

The N-gram model is a model that assumes that the utilization of a word depends on the previous (n-1) words.

That is, the STT server 10 may determine whether the text data converted from the speech data is properly converted by using the language model, thereby increasing the accuracy of the conversion into text data.

The NLP server 20 may receive text data from the STT server 10. The NLP server 20 may perform intention analysis on the text data based on the received text data.

The NLP server 20 may transmit, to the AI device 100, intention analysis information indicating the result of performing the intention analysis.

The NLP server 20 may generate intention analysis information by sequentially performing a morpheme analysis step, a syntax analysis step, a speech act analysis step, and a conversation processing step on the text data.

The morpheme analysis step is to classify text data corresponding to a speech uttered by a user into morpheme units, which are smallest units having meanings, and determine which parts of speech each classified morpheme has.

The syntax analysis step is to classify text data into noun phrases, verb phrases, adjective phrases, etc., by using the result of the morpheme analysis step, and determine what kind of relationship exists between the separated phrases.

Through the syntax analysis step, the subject, object, and modifier of the speech uttered by the user may be determined.

The speech act analysis step is a step of analyzing the intention of the speech uttered by the user by using the result of the syntax analysis step. In detail, the speech act analysis is a step of determining the intention of the sentence, such as whether the user asks a question, makes a request, or expresses a simple emotion.

The conversation processing step is a step of using the result of the speech act analysis step to determine whether to answer the user's speech, whether to respond to the question, or whether to ask additional information.

After the conversation processing step, the NLP server 20 may generate intention analysis information including at least one of a response to the intention uttered by the user, a response, or an inquiry of additional information.

Meanwhile, the NLP server 20 may receive text data from the AI device 100. For example, if the AI device 100 supports the speech to text conversion function, the AI device 100 may convert speech data into text data and transmit the converted text data to the NLP server 20.

The speech synthesis server 30 may generate the synthesized speech by combining the prestored speech data.

The speech synthesis server 30 may record the speech of one person selected as a model, and divide the recorded speech on a syllable or word basis. The speech synthesis server 30 may store the divided speech in an internal or external database on a syllable or word basis.

The speech synthesis server 30 may search for a syllable or word corresponding to the given text data from a database, synthesize a combination of the found syllable or word, and generate a synthesized speech.

The speech synthesis server 30 may store a plurality of speech language groups respectively corresponding to a plurality of languages.

For example, the speech synthesis server 30 may include a first speech language group recorded in Korean and a second speech language group recorded in English.

The speech synthesis server 30 may translate text data of the first language into text of the second language, and generate a synthesized speech corresponding to the translated text of the second language by using the second speech language group.

The speech synthesis server 30 may transmit the generated synthesized speech to the AI device 100.

The speech synthesis server 30 may receive intention analysis information from the NLP server 20.

The speech synthesis server 30 may generate the synthesized speech reflecting the intention of the user, based on the intention analysis information.

In one embodiment, the STT server 10, the NLP server 20, and the speech synthesis server 30 may be implemented by one server.

The functions of the STT server 10, the NLP server 20, and the speech synthesis server 30 described above may also be performed in the AI device 100. To this end, the AI device 100 may include a plurality of processors.

Figure 3:
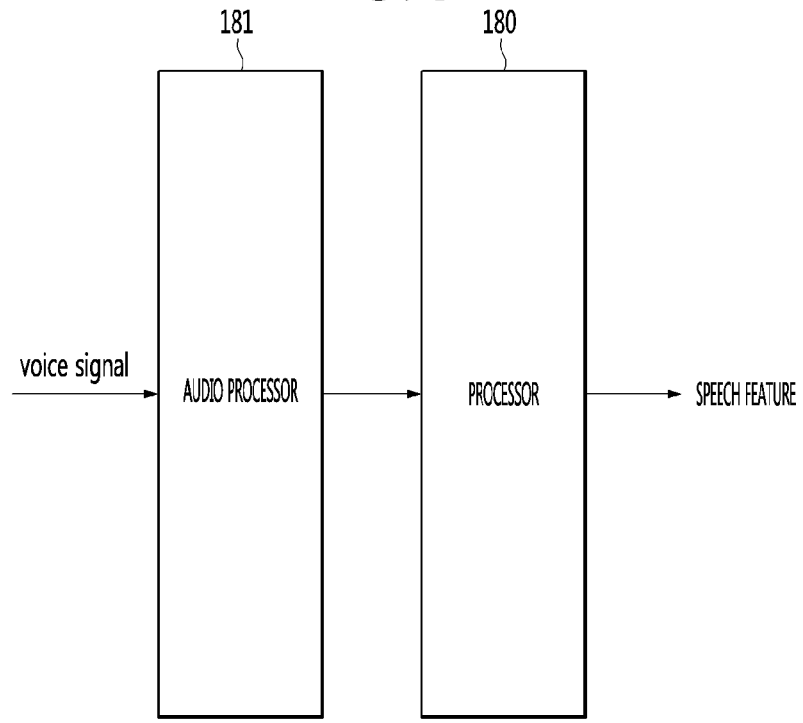
FIG. 3 is a diagram for describing a process of extracting a speech feature of a user from a voice signal according to an embodiment of the present disclosure.

FIG. 3 is a diagram for describing a process of extracting a speech feature of a user from a voice signal according to an embodiment of the present disclosure.

The AI device 100 shown in FIG. 1 may further include an audio processor 181.

The audio processor 181 may be implemented by a chip separate from the processor 180, or may be implemented by a chip included in the processor 180.

The audio processor 181 may remove noise from the voice signal.

The audio processor 181 may convert the voice signal into text data. To this end, the audio processor 181 may include an STT engine.

The audio processor 181 may recognize a wakeup word for enabling the speech recognition of the AI device 100. The audio processor 181 may convert the wakeup word received through the microphone 122 into text data. If the converted text data is text data corresponding to the prestored wakeup word, the audio processor 181 may determine that the wakeup word is recognized.

The audio processor 181 may convert the voice signal, from which noise is removed, into the power spectrum.

The power spectrum may be a parameter indicating a frequency component included in the waveform of the time-varying voice signal and a magnitude of the frequency component.

The power spectrum shows the distribution of amplitude squared values with respect to the frequency of the waveform of the voice signal.

This will be described below with reference to FIG. 4.

Figure 4:
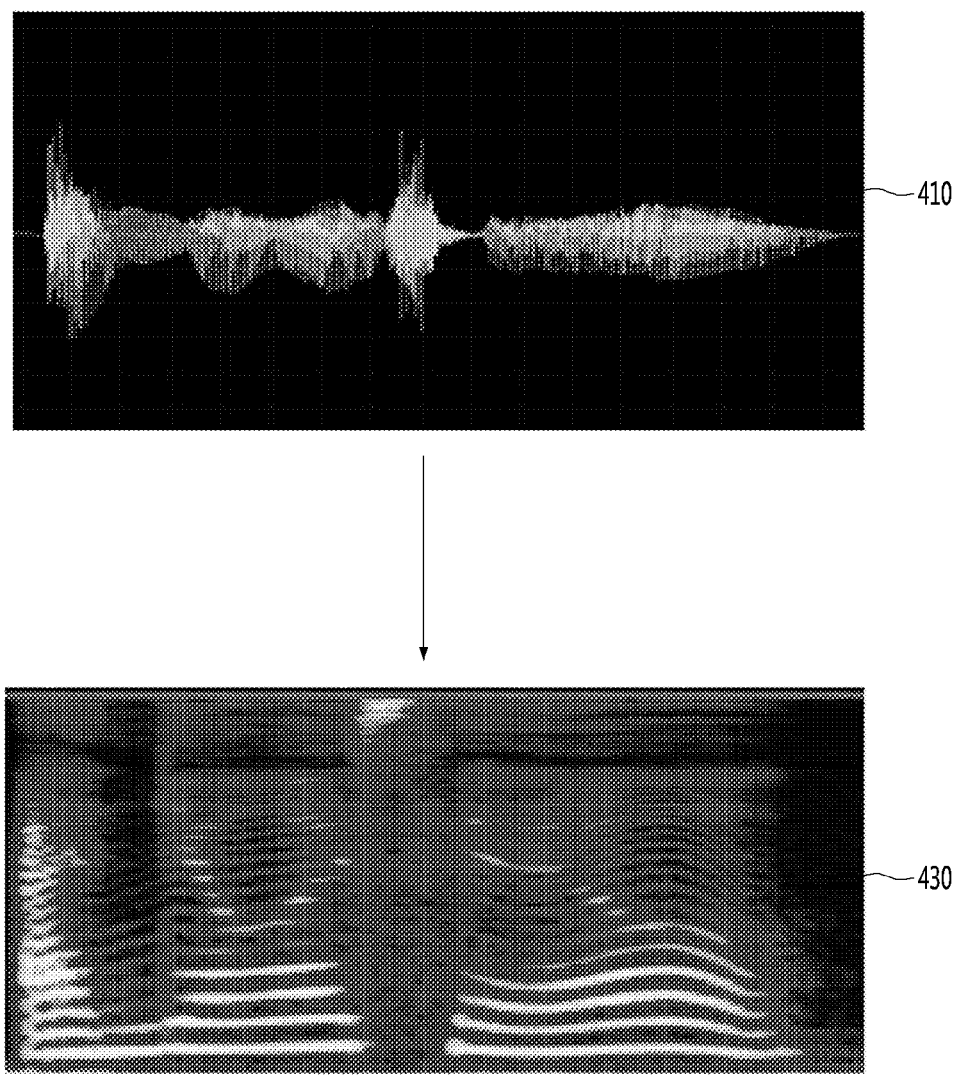
FIG. 4 is a diagram for describing an example in which a voice signal is converted into a power spectrum according to an embodiment of the present disclosure.

FIG. 4 is a diagram for describing an example in which a voice signal is converted into a power spectrum according to an embodiment of the present disclosure.

Referring to FIG. 4, a voice signal 410 is shown. The voice signal 410 may be a signal received through the microphone 121, or may be a signal stored in advance in the memory 170.

The x-axis of the voice signal 410 may represent time, and the y-axis may represent amplitude.

The audio processor 181 may convert the voice signal 410 having the x-axis as the time axis into a power spectrum 430 having the x-axis as the frequency axis.

The audio processor 181 may convert the voice signal 410 into the power spectrum 430 by using a fast Fourier transform (FFT).

The x-axis of the power spectrum 430 represents the frequency, and the y-axis represents the square value of amplitude.

FIG. 3 is described again.

The processor 180 may determine the speech feature of the user by using one or more of the text data or the power spectrum 430 transmitted from the audio processor 181.

The speech feature of the user may include the gender of the user, the pitch of the user, the tone of the user, the subject of the user's speech, the speed of the user's speech, and the user's volume.

The processor 180 may acquire the frequency of the voice signal 410 and the amplitude corresponding to the frequency of the voice signal 410 by using the power spectrum 430.

The processor 180 may determine the gender of the user who utters the speech by using the frequency band of the power spectrum 430.

For example, if the frequency band of the power spectrum 430 is within a predetermined first frequency band range, the processor 180 may determine that the gender of the user is a male.

If the frequency band of the power spectrum 430 is within a predetermined second frequency band range, the processor 180 may determine that the gender of the user is a female.

The second frequency band range may be larger than the first frequency band range.

The processor 180 may determine the pitch of the speech by using the frequency band of the power spectrum 430.

For example, the processor 180 may determine the pitch of the speech based on the magnitude of the amplitude within a specific frequency band range.

The processor 180 may determine the tone of the user by using the frequency band of the power spectrum 430. For example, the processor 180 may determine, as a main speech band of the user, a frequency band of which amplitude is greater than or equal to a predetermined magnitude among the frequency bands of the power spectrum 430, and determine the determined main speech band as the tone of the user.

The processor 180 may determine the speech speed of the user from the converted text data through the number of syllables uttered per unit time.

The processor 180 may determine the subject of the user's speech with respect to the converted text data by using a Bag-Of-Word Model technique.

The bag-of-word model technique is a technique for extracting a commonly used word based on the frequency of words in a sentence. In detail, the bag-of-word Model technique is a technique for extracting a unique word in a sentence and expressing the frequency of each extracted word as a vector to determine the feature of the subject of speech.

For example, if a word such as <running>or <physical fitness>frequently appears in text data, the processor 180 may classify the subject of the user's speech as an exercise.

The processor 180 may determine the subject of the user's speech from the text data by using a known text categorization technique. The processor 180 may extract a keyword from the text data to determine the subject of the user's speech.

The processor 180 may determine the volume of the user in consideration of amplitude information in the entire frequency band.

For example, the processor 180 may determine the volume of the user based on an average or a weighted average of amplitudes in each frequency band of the power spectrum.

The functions of the audio processor 181 and the processor 180 described with reference to FIGS. 3 and 4 may be performed by any one of the NLP server 20 and the speech synthesis server 30.

For example, the NLP server 20 may extract the power spectrum by using the voice signal, and determine the speech feature of the user by using the extracted power spectrum.

Figure 5:
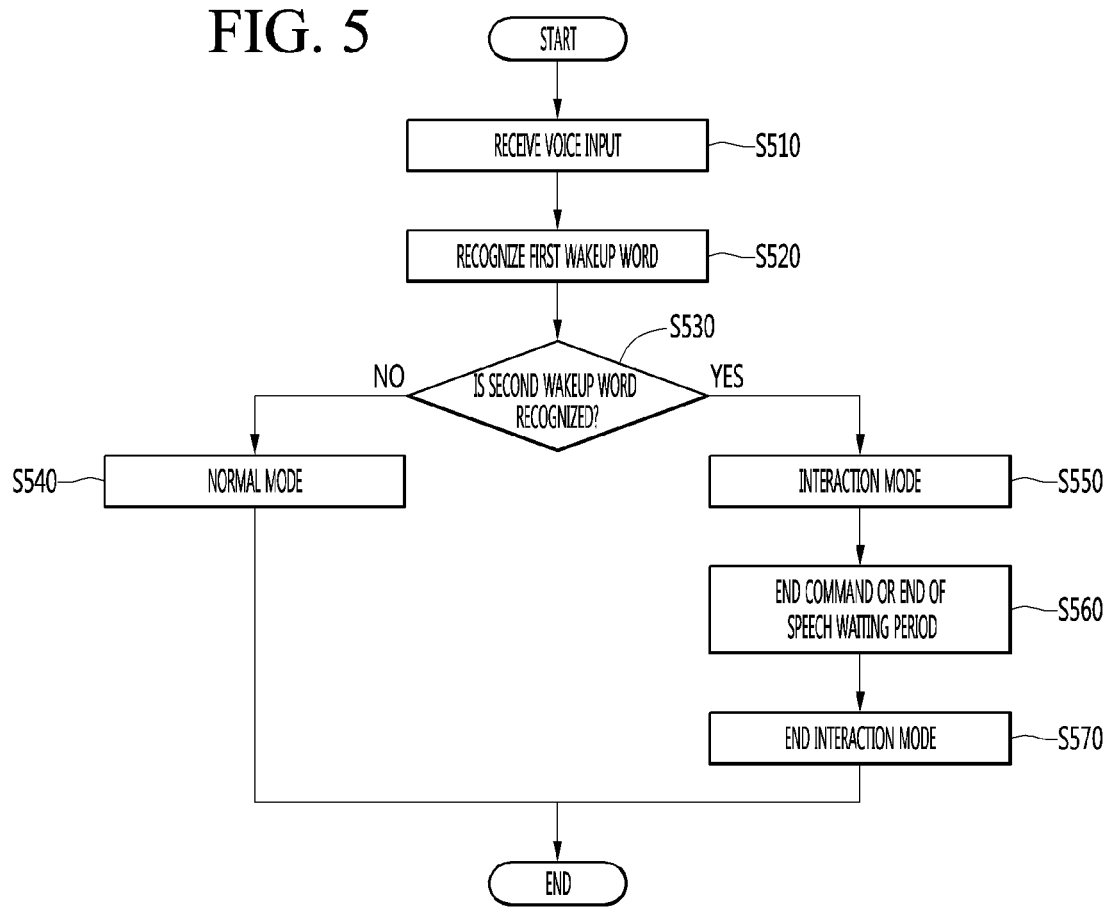
FIG. 5 is a diagram for describing a method of operating an AI device according to an embodiment of the present disclosure.

FIG. 5 is a diagram for describing a method of operating an AI device according to an embodiment of the present disclosure.

A method for operating an AI device according to an embodiment of the present disclosure may include: receiving a speech input (S510); recognizing a first wakeup word for calling the AI device (S520); determining whether a second wakeup word for setting an operation mode is recognized after the first wakeup word is recognized (S530); if a command is received after the first wakeup word is recognized, operating in a normal mode (S540); if the second wakeup word is recognized after the first wakeup word is recognized, operating in an interaction mode to process one or more commands received after the second wakeup word according to an operation mode indicated by the second wakeup word (S550); determining whether an end command is received in the interaction mode or a speech waiting period is ended (S560); and if the end command is received or the speech waiting period is ended, ending the interaction mode (S570).

Figure 6:
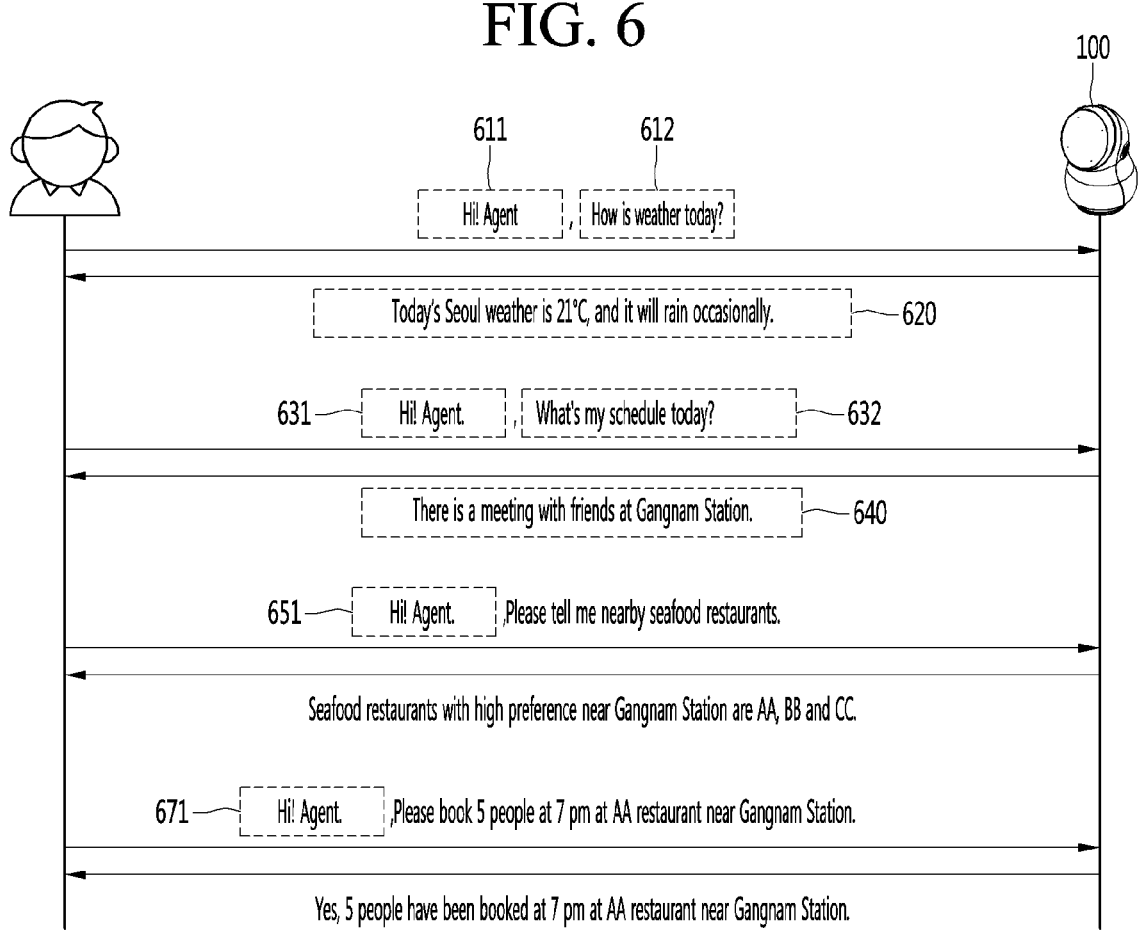
FIG. 6 is a diagram for describing a problem occurring in the related art.

FIG. 6 is a diagram for describing a problem occurring in the related art.

Conventionally, a user utters a wakeup word to call a speech agent, and utters a command (request, question, etc.) following the wakeup word.

In this case, after recognizing the wakeup word, the speech agent changed the command recognition function from an inactive state to an active state and recognizes the command. Then, the speech agent processes the command and disables the command recognition function again if a short speech waiting period is ended after processing the command.

In other words, the user is provided with a speech recognition service by uttering a wakeup word, a one-time request or question, re-uttering a wakeup word, and repeating a one-time request or question that is independent of a previous request or question.

In detail, the user utters the wakeup word 611 to call the speech agent, and then utters the first command 612 following the wakeup word 611.

In this case, after recognizing the wakeup word 611, the AI device 100 recognizes the first command 612 by changing the command recognition function from an inactive state to an enabled state. The AI device 100 processes the first command 612 to output a response 620 corresponding to the first command 612, and disables the command recognition function again after the short speech waiting period is ended after processing the first command 612.

In this case, the user utters the wakeup word 631 again to call the speech agent, and then utters the second command 632 following the wakeup word 631.

In this case, after recognizing the wakeup word 631, the AI device 100 recognizes the second command 632 by changing the command recognition function from an inactive state to an enabled state. The AI device 100 processes the second command 632 to output a response 640 corresponding to the second command 632, and disables the command recognition function again after the short speech waiting period is ended after processing the second command 632.

Therefore, in the case of performing the speech recognition in a uniform manner, there occurs a problem that the user utters the wakeup words 611, 631, 651, and 671 whenever the command is input.

In addition, if the command is received, the AI device 100 processes the received command independently of the previously received command and response. That is, if the command is received after the wakeup word, the AI device 100 understands and processes only the meaning of the command received after the wakeup word, without considering the context of the conversation previously communicated with the user.

These problems are factors that hinder natural and continuous communication with the user. Therefore, there is a problem that cannot provide a speech recognition service in the form of interacting with the user.

Meanwhile, the speech recognition process described below may be performed by the AI device, or may be performed by the server communicating with the AI device. In addition, the speech recognition process described below may be performed by the AI device and the server.

In detail, the speech recognition engine is mounted on the AI device, and the recognition of the first wakeup word, the second wakeup word, and the command may be performed by the AI device.

In addition, the speech recognition engine is mounted on the server, and the recognition of the first wakeup word, the second wakeup word, and the command may be performed by the server.

If the recognition of the first wakeup word, the second wakeup word, and the command is performed by the server, the processor of the AI device may transmit the speech input of the user to the server. In this case, the server may receive the speech input of the user and recognize at least one of the first wakeup word, the second wakeup word, or the command. In addition, the server may recognize the first wakeup word and the second wakeup word, determine an operation mode of the AI device, and transmit the determined operation mode to the AI device. In this case, the processor may operate according to the received operation mode. In addition, the server may determine the meaning of the recognized command and transmit the determined meaning to the AI device. In this case, the AI device may process the command based on the received meaning of the command.

In addition, some of the recognition of the first wakeup word, the recognition of the second wakeup word, and the recognition of the command may be performed by the AI device, and the others may be performed by the server.

The operation of the present disclosure described below may be performed only by the AI device, may be performed only by the server, or may be performed separately by the server and the AI device. To this end, the server may include the configuration of the AI device described with reference to FIG. 1 and perform the function of the AI device. In addition, data may be transmitted between the server and the AI device so that the operations described below may be performed separately by the server and the AI device.

In addition, the meaning that the wakeup word is recognized as described below may include both the recognition of the wakeup word in the AI device and the recognition of the wakeup word in the server.

In addition, the processing of the command as described below may include both the operation in which the meaning of the command is determined in the AI device and the AI device operates according to the meaning of the command and the operation in which the meaning of the command is determined in the server and the AI device operates according to the meaning of the command.

Figure 7:
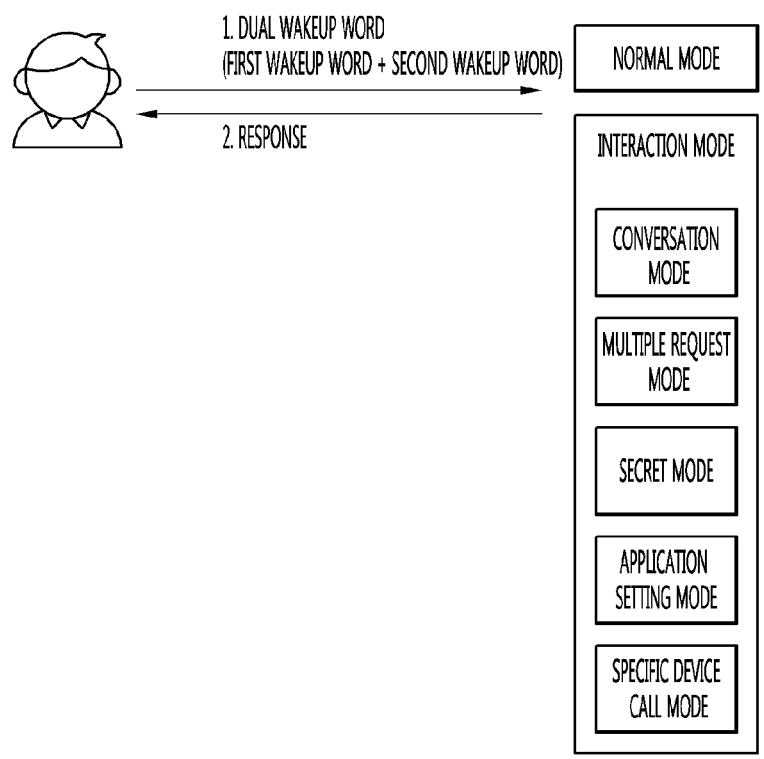
FIG. 7 is a diagram for describing a method of setting an operation mode of an AI device according to an embodiment of the present disclosure.

FIG. 7 is a diagram for describing a method of setting an operation mode of an AI device according to an embodiment of the present disclosure.

The term "AI device 100" may be used interchangeably with the term "AI apparatus 100."

The AI device 100 may be called by the first wakeup word.

The meaning that the AI device 100 is called may mean that the electronic device enters a command waiting state.

The command waiting state may refer to a state in which, if the speech is received, the command included in the speech can be recognized by processing the received speech.

In detail, the AI device 100 is normally operated in a call waiting state. If the speech is received in the call waiting state, the AI device 100 processes the speech by using the speech recognition engine to determine whether the wakeup word is included in the speech.

If the first wakeup word is included in the speech, the AI device 100 operates in the command waiting state, and if the wakeup word is not included in the speech, the AI device 100 maintains the call waiting state as it is.

Meanwhile, the processor 180 may receive the speech input through the input unit 120.

The processor 180 may recognize the first wakeup word for calling the AI device, which is included in the received speech input.

For example, if the user called the first wakeup word "Hi! Agent", the AI device 100 may receive a speech input including the first wakeup word "Hi! Agent" and determine that the first wakeup word "Hi! Agent" is included in the speech input through recognition of the speech input.

If the first wakeup word is recognized, the processor 180 may operate in a command waiting state.

Meanwhile, when the second wakeup word for setting the operation mode is received after the first wakeup word for calling the AI device is recognized, the processor 180 may operate in the interaction mode.

In detail, the processor may determine whether the second wakeup word for setting the operation mode is recognized after the first wakeup word is recognized. The terms that can be recognized as the second wakeup word may be stored in the memory.

If the second wakeup word for setting the operation mode is recognized after the first wakeup word is recognized, the processor may operate in the interaction mode.

The second wakeup word may be the term for setting the operation mode of the AI device to the interaction mode instead of the normal mode. In addition, the second wakeup word may be the term for designating any one of a plurality of detailed modes included in the interaction mode.

The interaction mode may include a plurality of detailed modes. In detail, the interaction mode may include at least one of a conversation mode, a multiple request mode, a secret mode, an application setting mode, and a specific device call mode.

Meanwhile, if the second wakeup word is continuously recognized after the first wakeup word is recognized, the processor may operate in the interaction mode.

Specifically, if the second wakeup word is recognized within a predetermined time after the first wakeup word is recognized, if the second wakeup word is recognized without recognizing the command after the first wakeup word is recognized, or if the second wakeup word is recognized within a predetermined time without recognizing the command after the first wakeup word is recognized, the processor may operate in the interactive mode.

Meanwhile, if the second wakeup word is recognized after a predetermined time has elapsed after the first wakeup word is recognized, or if the command is recognized after the first wakeup word is recognized and then the second wakeup word is recognized, the processor may not operate in the interactive mode.

In other words, according to the present disclosure, the processor operates in the interaction mode if the second wakeup word is continuously recognized after the first wakeup word is recognized. The interaction mode can be provided only when the intention of the user who wants to use the interaction mode is clear, and various malfunctions can be prevented.

Meanwhile, if the first command is received after the first wakeup word is recognized, the processor 180 may operate in the normal mode.

The normal mode may be the same as the operation of the related art described with reference to FIG. 6.

That is, if the first command is received after the first wakeup word is recognized, the processor may operate in the normal mode to process the first command. If the first wakeup word is recognized after the first command is processed and the second command is received after the first wakeup word is recognized, the processor may process the second command.

Meanwhile, the command may include at least one of a request for a service or a request for an answer.

For example, "play music" may be a request for a service for playing music. In another example, "How is the weather today?" may be a request for an answer.

The meaning of processing the command may include at least one of performing the service corresponding to the command, outputting the execution result after performing the service corresponding to the command, or outputting the answer.

In addition, the meaning of outputting the response corresponding to the command may include at least one of outputting the execution result after performing the service corresponding to the command, or outputting the answer.

Meanwhile, if the first command is continuously received after the first wakeup word is recognized, the processor may operate in the normal mode to process the first command.

In detail, if the first command is received within a predetermined time after the first wakeup word is recognized, the processor may operate in the normal mode to process the first command.

Meanwhile, if the first command is received after the predetermined time elapses after the first wakeup word is recognized, or if the first command is not received, the processor may not provide the speech recognition function.

Meanwhile, if the second wakeup word for setting the operation mode is recognized after the first wakeup word is recognized, the processor may operate in the interactive mode and process one or more commands received after the second wakeup word according to the operation mode indicated by the second wakeup word.

The interaction mode will be described in detail with reference to FIGS. 8 to 11.

Figure 8:
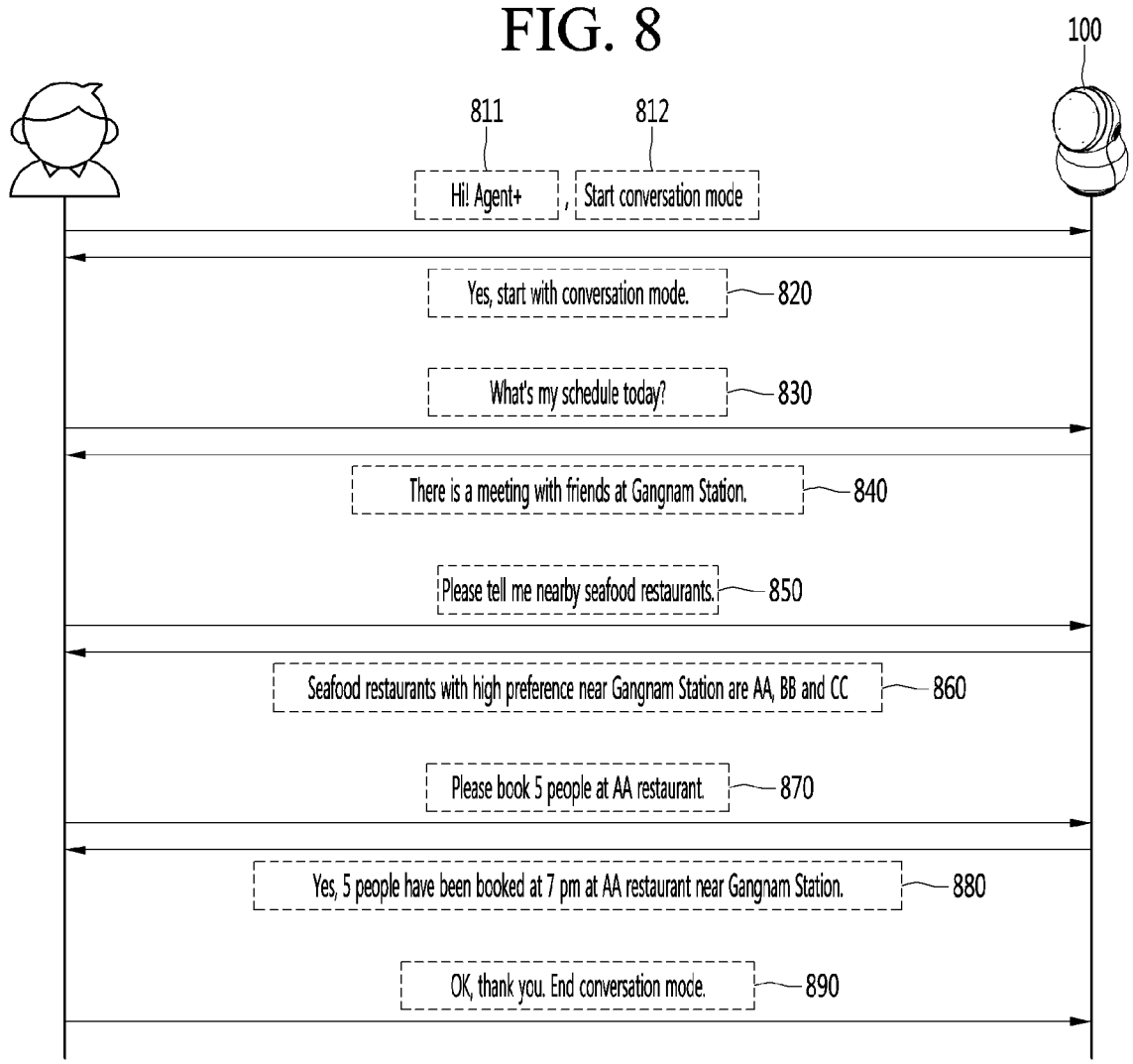
FIG. 8 is a diagram for describing a conversation mode according to an embodiment of the present disclosure.

FIG. 8 is a diagram for describing a conversation mode according to an embodiment of the present disclosure.

The conversation mode is a mode in which a command is processed in consideration of a previous conversation (previous command and response), and may be a mode capable of inducing mutual conversation with a user.

After the first wakeup word 811 is recognized, the processor may recognize the second wakeup word 812 corresponding to the conversation mode.

In detail, the second wakeup word may include a plurality of terms, and the plurality of terms may include the term corresponding to the conversation mode. For example, the second wakeup word may include the term "start the conversation mode".

In this case, if the term "start the conversation mode" is recognized, the processor may determine that the second wakeup word has been received, and may also determine to operate in the conversation mode among the interaction modes.

Meanwhile, if the second wakeup word 812 corresponding to the conversation mode is recognized after the first wakeup word 811 is recognized, the processor may output a response 840 corresponding to the third command 830 received after the second wakeup word 812 is recognized.

In detail, if the second wakeup word 812 corresponding to the conversation mode is recognized after the first wakeup word 811 is recognized, the processor may output the response 820 indicating that the mode is set to the conversation mode.

If the third command 830 is received, the processor may output a response 840 corresponding to the third command 830.

In addition, if a new fourth command 850 is received after the response 840 corresponding to the third command 830 is output, the processor may output a response 860 corresponding to the new fourth command 850.

In detail, in the conversation mode, if the next command is received within the speech waiting period after the command is processed, the processor may process the next command without inputting any wakeup word.

For example, in the conversation mode, if the fourth command 850 is received within the speech waiting period after the response 840 corresponding to the third command 830 is output, the processor may process the fourth command 850 even if the first wakeup word is not input.

The speech waiting period may be a period in which the enabling of the command recognition function is maintained after the command is processed. That is, if the speech waiting period elapses after the command is processed, the processor may disable the command recognition function.

Meanwhile, the speech waiting period in the conversation mode may be longer than the speech waiting period in the normal mode.

For example, in the normal mode, if the speech waiting period of 5 seconds has elapsed after the command is processed, the processor disables the command recognition function. Therefore, if the speech waiting period of 5 seconds has elapsed after the command is processed, the user must utter the first wakeup word again and then input the next command.

However, in the conversation mode, the processor may disable the command recognition function after the speech waiting period of 30 seconds has elapsed after the command is processed. Therefore, for 30 seconds after processing the command, the user may input the next command without having to uttering the first wakeup word again.

Meanwhile, the processor may store the conversation between the user and the AI device, that is, the command and the response, in the database. The database may be mounted on the memory of the AI device or in the memory of the server.

Meanwhile, if a new fourth command 850 is received after the response 840 corresponding to the third command 830 is output, the processor may output a response to the fourth command 850 in consideration of the previous conversation.

The previous conversation may be all or part of the commands and responses up to the present after the first wakeup word 811 and the second wakeup word 812 are received.

In addition, the consideration of the previous conversation may mean that the command is processed in consideration of the context of the previous conversation.

In detail, if a new fourth command 850 is received after the response 840 corresponding to the third command 830 is output, the processor may output a response 860 corresponding to the new fourth command 850 and related to at least one of the third command 830 or the response 840 corresponding to the third command.

For example, the fourth command 850 is "please tell me nearby seafood restaurants." According to the conventional method of independently processing the command recognized after the wakeup word, the meaning of "nearby" may not be interpreted or may be interpreted as "near the current position."

However, since the conversation mode considers the preceding conversation, the processor may determine that the "nearby" means "near Gangnam Station."

Considering the previous conversation ("There is a meeting with friends at Gangnam Station"), the processor may recommend a restaurant near Gangnam Station.

In the same manner, if a new fifth command 870 is received after a response 860 corresponding to the fourth command 850 is output, the processor may output a response 880 corresponding to the new fifth command 870 and related to all or part of the previous conversations 830, 840, 850, and 860.

For example, the fifth command 870 is "Please book 5 people at AA restaurant". According to the conventional method of independently processing commands recognized after the wakeup word, if the AA restaurant is a franchise, the processor does not interpret which local AA restaurant it is, and does not know the time to make a reservation.

However, since the conversation mode considers the preceding conversation, the processor may make a reservation at 7 pm to the AA restaurant near Gangnam Station.

Thus, according to the conversation mode, since the speech recognition service is provided in consideration of the context of the preceding conversation without the need to input a wakeup word in the middle of the conversation, natural and continuous communication with the user may be possible.

In addition, according to the conversation mode, the speech waiting period is extended to secure enough time for the conversation. Therefore, there is an advantage that can satisfy the desire of the user to talk to the speech agent in the form of the conversation without having to input the wakeup word every time.

Meanwhile, if an end command 890 is received in the conversation mode, the processor may end the conversation mode.

In addition, if the speech waiting period is ended, the processor may end the conversation mode.

Additionally, if no additional command is received for a certain time after the command is processed, the processor may output a message asking for the end of the conversation. If a command for accepting the end of the conversation is received, the processor may end the conversation mode.

Figure 9:
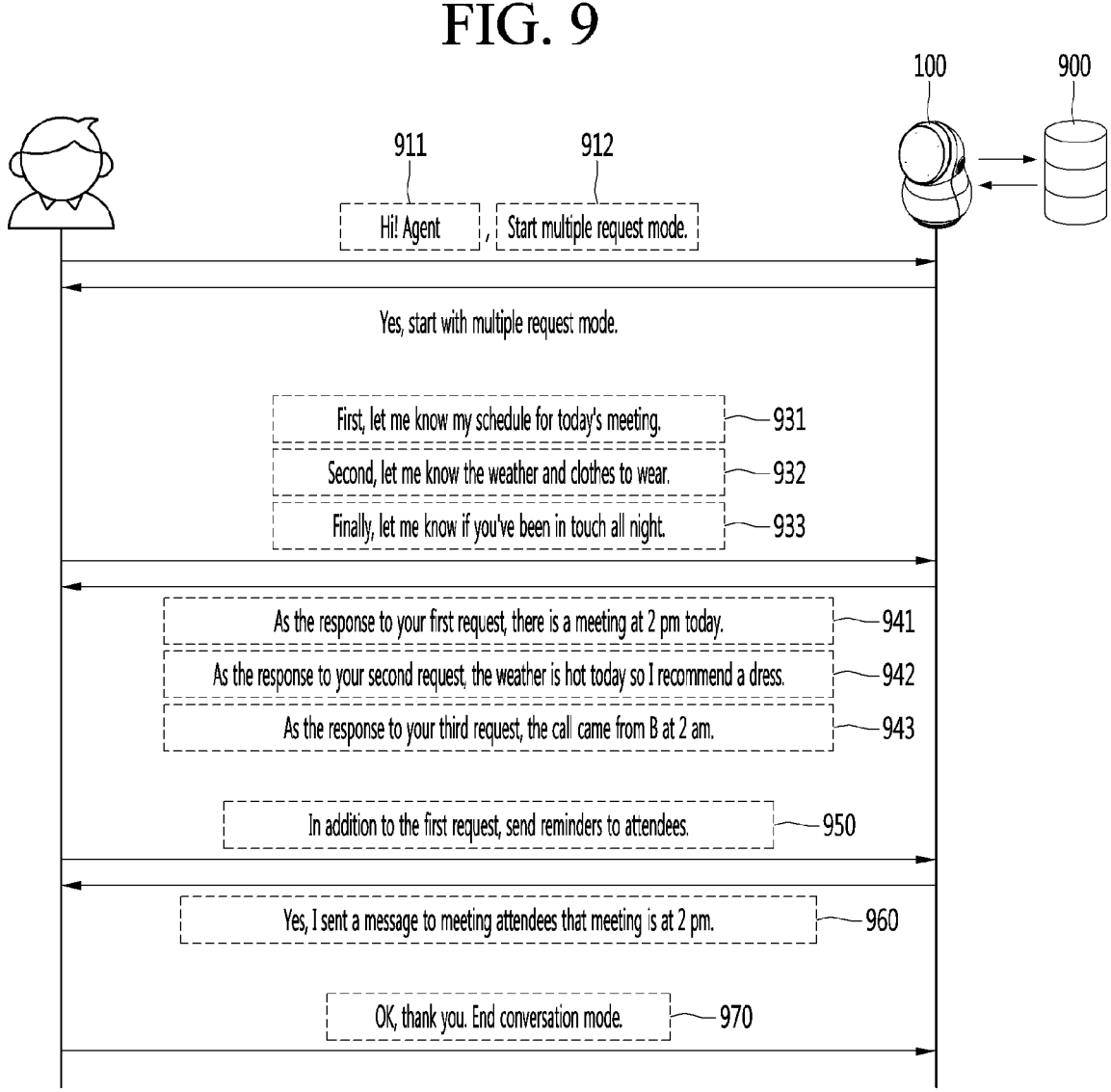
FIG. 9 is a diagram for describing a multiple request mode according to an embodiment of the present disclosure.

FIG. 9 is a diagram for describing a multiple request mode according to an embodiment of the present disclosure.

The multiple request mode may be a mode for collectively receiving a plurality of commands and collectively performing processing on the plurality of commands.

After the first wakeup word 911 is recognized, the processor may recognize the second wakeup word 912 corresponding to the multiple request mode.

In detail, the second wakeup word may include a plurality of terms, and the plurality of terms may include a term corresponding to the multiple request mode. For example, the second wakeup word may include the term "start the multiple request mode."

In this case, if the term "start the multiple request mode" is recognized, the processor may determine that the second wakeup word has been received, and may also determine to operate in the multiple request mode among the interaction modes.

Meanwhile, if the second wakeup word 912 corresponding to the multiple request mode is recognized after the first wakeup word 911 is recognized and a fifth command and a sixth command are received after the second wakeup word is recognized, the processor may output a response corresponding to the fifth command and a response corresponding to the sixth command after the fifth command and the sixth command are received.

In this case, not only two commands but also three or more commands may be collectively input after the second wakeup word is recognized.

For example, if the second wakeup word 912 corresponding to the multiple request mode is recognized after the first wakeup word 911 is recognized and a fifth command 931, a sixth command 932, and a seventh command 933 are sequentially received after the second wakeup word 912 is recognized, the processor may sequentially output a response 941 corresponding to the fifth command, a response 942 corresponding to the sixth command, and a response 943 corresponding to the seventh command after the fifth command 931, the sixth command 932, and the seventh command 933 are received.

In this case, if the seventh command 933 is received and a predetermined time elapses, the processor may determine that all commands have been received and process the plurality of received commands.

Meanwhile, if the second wakeup word 912 corresponding to the multiple request mode is recognized after the first wakeup word 911 is recognized and a plurality of commands are received after the second wakeup word is recognized, the processor may distinguish a plurality of commands by using an identification command included in each of the plurality of commands.

In detail, the processor may distinguish the fifth command from the sixth command by using the first identification command included in the fifth command 931 and the second identification command included in the sixth command 932.

For example, the processor may recognize that the speech between "first" and "second" corresponds to the fifth command 931 by using the term "first" included in the fifth command 931 and the term "second" included in the sixth command 932.

In addition, the processor may recognize that the speech after the "second" corresponds to the sixth command 932 by using the term "second" included in the sixth command 932.

If the seventh command 933 is additionally received, the processor may distinguish the sixth command 932 from the seventh command 933 by using the term "last" included in the seventh command 933, and may recognize that the speech after "last" corresponds to the seventh command 933.

Meanwhile, in the multiple request mode, the processor may process a plurality of commands even if the plurality of commands are continuously received without input of the wakeup word.

Specifically, in the multiple request mode, if the next command is received within a predetermined time after the command is received, the processor may process the command and the next command without input of the wakeup word.

For example, in the multiple request mode, if the sixth command 932 is received within the speech waiting period after the fifth command 931 is received, and the seventh command 933 is received within the speech waiting period after the sixth command 932 is received, the processor may process the fifth command 931, the sixth command 932, and the seventh command 933 even if the first wakeup word is not additionally input after the first wakeup word 911 is input.

Meanwhile, the processor may store the conversation between the user and the AI device, that is, the command and the response, in the database. The database may be mounted on the memory of the AI device or in the memory of the server.

In detail, the processor may perform STT conversion on the command and the response and store the same in the database.

In this case, the processor may store matching information matching the response corresponding to the command and the identification command included in the command.

For example, the processor may store, in the fifth command, matching information matching the response corresponding to the fifth command and the first identification command included in the fifth command.

In the multiple request mode, if an additional response request for any one of the plurality of commands is received, the processor may output an additional response related to the command for which the additional response request is received.

In detail, if an additional response request 950 is received for the fifth command 931 among the fifth command 931, the sixth command 932, and the seventh command 933, the processor may output an additional response 960 corresponding to the additional response request 950 and related to the fifth command 950 by using the stored fifth command 931.

Meanwhile, the additional response request 950 may include an identification command included in the command that is the target of the additional response.

In detail, the additional response request to the fifth command 931 may include the first identification command ("first") included in the fifth command 931.

If the additional response request 950 including the first identification command ("first") is received, the processor may output the additional response 960 related to the fifth command by using the stored fifth command 931.

Meanwhile, if the additional response request 950 is received, the processor may output the response to the additional response request 950 in consideration of the command that is the target of the additional response or the response corresponding to the command that is the target of the additional response.

In detail, if the additional response request 950 is received for the fifth command 931 among the fifth command 931, the sixth command 932, and the seventh command 933, the processor may process the additional response request 950 in consideration of the meaning of at least one of the stored fifth command 931 or the response 941 to the fifth command.

For example, the fifth command 931 includes the term "today's meeting schedule", and the response to the fifth command 940 includes the term "two o'clock".

If the additional response request 950 for sending a reminder to the attendees is received, the processor may send a message to the meeting attendee that the meeting is open at 2 o'clock, in consideration of the fifth command 931, and may output the processing result.

If the next command is received within the speech waiting period after the command is processed, the processor may process the next command without input of the wakeup word.

For example, in the multiple request mode, if the fifth command and the sixth command are received and processed, and after the fifth command and the sixth command are processed, the eighth command is received within the speech waiting period, the processor may process the eighth command without input of the first wakeup word.

The speech waiting period may be a period in which the enabling of the command recognition function is maintained after the command is processed. That is, if the speech waiting period elapses after the command is processed, the processor may disable the command recognition function.

Meanwhile, the speech waiting period in the multiple request mode may be longer than the speech waiting period in the normal mode.

For example, in the normal mode, if the speech waiting period of 5 seconds has elapsed after the command is processed, the processor disables the command recognition function. Therefore, if the speech waiting period of 5 seconds has elapsed after the command is processed, the user must utter the first wakeup word again and then input the next command.

However, in the multiple request mode, the processor may disable the command recognition function after the speech waiting period of 30 seconds has elapsed after the command is processed. Therefore, for 30 seconds after processing the command, the user may input the next command without having to uttering the first wakeup word again.

Thus, according to the multiple request mode, since the input of the plurality of commands and the response are achieved without input of the wakeup word in the middle of the conversation, natural and continuous communication with the user may be possible.

In addition, according to the multiple request mode, the speech waiting period is extended to secure enough time for the conversation. Therefore, there is an advantage that can satisfy the desire of the user to talk to the speech agent in the form of the conversation without having to input the wakeup word every time.

Meanwhile, if an end command 970 is received in the multiple request mode, the processor may end the multiple request mode.

In addition, if the speech waiting period is ended, the processor may end the multiple request mode.

Additionally, if no additional command is received for a certain time after the command is processed, the processor may output a message asking for the end of the conversation. If a command for accepting the end of the conversation is received, the processor may end the multiple request mode.

In addition, if the multiple request mode is ended, the processor may delete the conversation (command and response) between the user and the AI device from the database after the first wakeup word and the second wakeup word are received.

Figure 10:
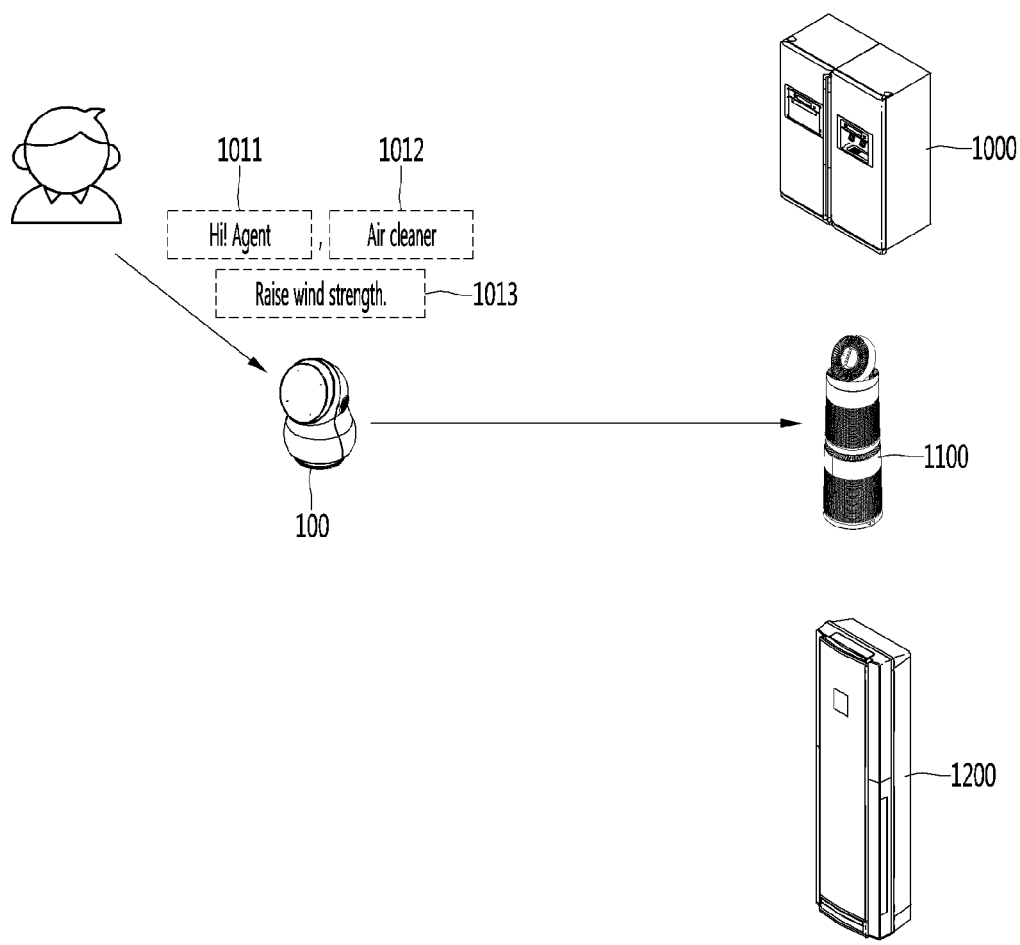
FIG. 10 is a diagram for describing a specific device call mode according to an embodiment of the present disclosure.

FIG. 10 is a diagram for describing a specific device call mode according to an embodiment of the present disclosure.

The specific device call mode may be a mode for enabling only home appliances designated by the user.

After the first wakeup word 1011 is recognized, the processor may recognize the second wakeup word 1012 corresponding to the specific device call mode.

In detail, the second wakeup word may include a plurality of terms, and the plurality of terms may include the term corresponding to the specific device call mode.

Meanwhile, if the second wakeup word 1012 corresponding to the specific device call mode is recognized after the first wakeup word 1011 is recognized, the processor may enable the speech agent of the home appliance indicated by the second wakeup word.

In detail, the AI device 100 may communicate with a plurality of home appliances 1000, 1100, and 1200 disposed in one space (e.g., home, office).

In addition, the plurality of home appliances 1000, 1100, and 1200 may perform the function of the speech agent. The description of the AI device 100 described above may be applied to the function of the speech agent performed by the plurality of home appliances 1000, 1100, and 1200.

If the second wakeup word 1012 corresponding to the specific device call mode is recognized after the first wakeup word 1011 is recognized, the processor may transmit a speech agent enable command to the home appliance indicated by the second wakeup word.

For example, if the second wakeup word 1012 indicates an air cleaner 1100, the processor may transmit the speech agent enable command to the air cleaner 1100.

Meanwhile, the home appliance indicated by the second wakeup word may receive the speech agent enable command, enable the speech agent, and enter the command waiting state.

Meanwhile, the user may utter the command 1013 after uttering the first wakeup word 1011 and the second wakeup word 1012.

In this case, the processor of the AI device may receive the command 1013 and transmit the received command to the home appliance (the home appliance in which the speech agent is enabled) indicated by the second wakeup word.

However, the present disclosure is not limited thereto, and the home appliance (the home appliance in which the speech agent is enabled) indicated by the second wakeup word may directly receive a command 1013 uttered by the user through a microphone mounted on the home appliance indicated by the second wakeup word.

Meanwhile, if the command 1013 is received, the home appliance indicated by the second wakeup word may provide a service corresponding to the command 1013.

Meanwhile, if the second wakeup word 1012 corresponding to the specific device call mode is recognized after the first wakeup word 1011 is recognized, the processor may disable the speech agent of the home appliance other than the home appliance indicated by the second wakeup word.

In detail, if the second wakeup word 1012 corresponding to the specific device call mode is recognized after the first wakeup word 1011 is recognized, the processor may transmit the speech agent enable command to the home appliance indicated by the second wakeup word among the plurality of home appliances connected to the AI device 100, and transmit the speech agent disable command to the home appliance other than the home appliance indicated by the second wakeup word.

For example, if the second wakeup word 1012 indicates the air cleaner 1100, the processor may transmit the speech agent disable command to the air conditioner 1200.

The home appliance other than the home appliance indicated by the second wakeup word may receive the speech agent disable command and disable the speech agent. In this case, the home appliance other than the home appliance indicated by the second wakeup word may exit from the command waiting state.

Accordingly, even if the user utters the command 1013 after uttering the first wakeup word 1011 and the second wakeup word 1012, the home appliance other than the home appliance indicated by the second wakeup word may not provide a service corresponding to the command 1013.

Thus, according to the present disclosure, it is possible to prevent a malfunction that may occur when the commands are received from a plurality of home appliances. In addition, according to the present disclosure, the user can set the specific device call mode through a simple speech input (second wakeup word) and can designate the home appliance to receive the command.

Meanwhile, the second wakeup word corresponding to the specific device call mode may be a plurality of device call words set by a user and respectively corresponding to a plurality of home appliances.

In detail, the user may input settings of the device call word corresponding to the home appliance to the terminal or the AI device 100. If the terminal receives the input, the terminal may transmit the received input to the AI device 100.

For example, the user may input the device call word of a first air cleaner as a "bedroom air cleaner", a device call word of a second air cleaner as a "living room air cleaner", and a device call word of an air conditioner as a "cooler".

In this case, the processor may store, in the database, the matching information and the plurality of device call words respectively corresponding to the plurality of home appliances set by the user.

For example, the processor may store the device call word "bedroom air cleaner" and the matching information indicating that the "bedroom air cleaner" indicates the first air cleaner, the device call word "living room air cleaner" and the matching information indicating that the "living room air cleaner" indicates the second air cleaner, and the device call word "cooler" and the matching information indicating that the "cooler" indicates the air conditioner.

If any one of the plurality of device call words is recognized after the first wakeup word, the processor may determine that the second wakeup word has been received, the second wakeup word corresponding to the specific device call mode has been recognized, and the second wakeup word indicating the home appliance corresponding to the recognized device call word has been recognized.

The processor may enable the speech agent of the home appliance corresponding to the recognized device call word.

As described above, according to the present disclosure, the user can set the specific device call mode and designate the home appliance to receive the command just by directly setting the device call word, which is easy to use, and uttering the directly set device call word.

FIG. 11 is a diagram for describing a secret mode according to an embodiment of the present disclosure.

The secret mode may be a mode that does not leave a conversation record on the AI device or the server.

In detail, the processor may recognize the second wakeup word 1112 corresponding to the secret mode after the first wakeup word 1111 is recognized.

In detail, the second wakeup word may include a plurality of terms, and the plurality of terms may include the term corresponding to the secret mode. For example, the second wakeup word may include the term "start the secret mode".

In this case, if the term "start the secret mode" is recognized, the processor may determine that the second wakeup word has been received, and may also determine to operate in the secret mode among the interaction modes.

Meanwhile, the processor may store the conversation between the user and the AI device, that is, the command and the response, in the database. The database may be mounted on the memory of the AI device or in the memory of the server.

When the second wakeup word 1112 corresponding to the secret mode is recognized after the first wakeup word 1111 is recognized, the processor may delete the conversation (command and response) stored in the database, that is, the conversation record of the user.

In detail, if the second wakeup word 1112 corresponding to the secret mode is recognized after the first wakeup word 1111 is recognized, the processor may store, in the database, the conversation, that is, the command and the response, between the user and the AI device. In addition, if the secret mode is ended, the processor may delete the conversation stored in the database, that is, the conversation record of the user.

For example, if the second wakeup word 1112 corresponding to the secret mode is recognized after the first wakeup word 1111 is recognized, the processor may store the command 1130 and the response to the command 1130 in the database. If the secret mode is ended, the processor may delete the command 1130 and the response to the command 1130 from the database.

As described above, according to the present disclosure, there is an advantage that the secret mode can be set by speech using the second wakeup word. Therefore, it is possible to prevent personal conversation from being exposed through simple speech input.

Meanwhile, the application setting mode may be a mode in which a speech recognition agent can be set based on a speech.

In detail, an application for adjusting the setting of the speech recognition agent may be installed on the AI device or another terminal.

After the first wakeup word is recognized, the processor may recognize the second wakeup word corresponding to the application setting mode.

If the second wakeup word corresponding to the application setting mode is recognized after the first wakeup word is recognized, the processor may operate in the application setting mode.

In this case, if the command is received after the second wakeup word, the processor may control the setting function of the application to correspond to the command. Accordingly, the setting of the speech recognition agent may be adjusted by the command.

As described above, according to the present disclosure, there is an advantage that the setting of the speech recognition agent can be adjusted by speech using the second wakeup word.

Meanwhile, if an end command is received in the interaction mode or a speech waiting period is ended, the processor may terminate the interaction mode.

In detail, if one or more commands are received after the first wakeup word and the second wakeup word are recognized, the processor may process the received one or more commands. Then, when the end command (e.g., end the interactive mode) is received, the processor may disable the command recognition function.

In addition, if the speech waiting period elapses after the command is processed in the interaction mode, the processor may disable the command recognition function.

After the command recognition function is disabled, If the second wakeup word for setting the operation mode is recognized after the first wakeup word for calling the AI device is recognized, the processor may operate in the interaction mode again.

After the command recognition function is enabled, If the command is recognized after the first wakeup word for calling the AI device is recognized, the processor may operate in the normal mode.

According to the present disclosure, the interaction mode is simply ended via speech (end command), or the interaction mode is automatically ended after a certain time, thereby preventing misrecognition due to other sounds.

In addition, if the user uses the speech recognition agent again, the operation mode may be reset using the first and second wakeup words, thereby preventing confusion that may occur when using the speech recognition agent.

The present disclosure may be embodied as computer-readable codes on a program-recorded medium. The computer-readable recording medium may be any recording medium that stores data which can be thereafter read by a computer system. Examples of the computer-readable medium may include a hard disk drive (HDD), a solid state disk (SSD), a silicon disk drive (SDD), a ROM, a RAM, a CD-ROM, a magnetic tape, a floppy disk, and an optical data storage device. The computer may also include the processor 180 of the terminal. Therefore, the above description is illustrative and should not be construed as limited in all aspects. The scope of the present disclosure should be determined by reasonable interpretation of the appended claims, and all changes within the equivalent scope of the present disclosure fall within the scope of the present disclosure.

What is claimed is:

1. An artificial intelligence device comprising:
a microphone configured to receive a speech input; and
a processor configured to:
recognize a first wakeup word for calling the artificial intelligence device in response to receiving a first speech input;
recognize a second wakeup word for setting an operation mode in response to receiving a second speech input;
operate in an interaction mode based on recognizing the second wakeup word; and
process one or more commands received after the second wakeup word according to the operation mode indicated by the second wakeup word, wherein the interaction mode is selectable from among a conversation mode, a multiple request mode, a secret mode, an application setting mode, and a specific device call mode, wherein the conversation mode is a mode in which a command is processed in consideration of a previous conversation, and is a mode for inducing mutual conversation with a user, wherein the multiple request mode is a mode for collectively receiving a plurality of commands and collectively performing processing on the plurality of commands, wherein the secret mode is a mode for deleting a conversation record on the artificial intelligence device, wherein the application setting mode is a mode in which a speech recognition agent can be set based on a speech input, and wherein the specific device call mode is a mode for enabling only home appliances designated by the user.

2. The artificial intelligence device according to claim 1, wherein the processor is further configured to operate in the interaction mode based on the second wakeup word being continuously recognized after the first wakeup word is recognized.

3. The artificial intelligence device according to claim 1, wherein the processor is further configured to:
   operate in a normal mode to process a first command based on the first command being received after the first wakeup word is recognized; and
   process a second command based on the first wakeup word being recognized after the first command is processed and the second command is received after the first wakeup word is recognized.

4. The artificial intelligence device according to claim 3, wherein, in the conversation mode, based on a fourth command being received within a speech waiting period after a third command is processed, the processor is further configured to process the fourth command without input of the first wakeup word,
   wherein the speech waiting period in the conversation mode is longer than a speech waiting period in the normal mode.

5. The artificial intelligence device according to claim 3, wherein, based on the second wakeup word corresponding to the multiple request mode being recognized after the first wakeup word is recognized and a fifth command and a sixth command are received after the second wakeup word is recognized, the processor is further configured to output a response corresponding to the fifth command and a response corresponding to the sixth command after the fifth command and the sixth command are received.

6. The artificial intelligence device according to claim 5, wherein the processor is further configured to distinguish the fifth command from the sixth command by using a first identification command included in the fifth command and a second identification command included in the sixth command.

7. The artificial intelligence device according to claim 6, wherein, based on the processor further receiving an additional response request including the first identification command, the processor is further configured to output an additional response corresponding to the additional response request and related to the fifth command by using the fifth command.

8. The artificial intelligence device according to claim 5,
   wherein, based on a seventh command being received in the multiple request mode within a speech waiting period after the fifth command and the sixth command are processed, the processor is further configured to process the seventh command without input of the first wakeup word,
   wherein the speech waiting period in the multiple request mode is longer than a speech waiting period in the normal mode.

9. The artificial intelligence device according to claim 1, wherein, based on an end command being received in the interaction mode or a speech waiting period is ended, the processor is further configured to terminate the interaction mode.

10. The artificial intelligence device according to claim 1, wherein the second wakeup word corresponding to the specific device call mode includes a plurality of device call words set by the user and respectively corresponding to a plurality of home appliances.

11. The artificial intelligence device according to claim 1, wherein, based on the second wakeup word corresponding to the secret mode being recognized after the first wakeup word is recognized, the processor is further configured to delete a conversation record of the user.

\* \* \* \* \*